United States Patent

Kato et al.

[11] Patent Number: 6,074,710
[45] Date of Patent: Jun. 13, 2000

[54] LIQUID CRYSTAL GEL, GELLING AGENT, LIQUID CRYSTAL DEVICE, AND PROCESS FOR FABRICATING LIQUID CRYSTAL DEVICE

[75] Inventors: Takashi Kato, Kawasaki; Gota Kondo, Tokyo; Kenji Hanabusa, Ueda; Takaaki Kutsuna; Masakatsu Ukon, both of Tokyo, all of Japan

[73] Assignee: JSR Corporation, Tokyo, Japan

[21] Appl. No.: 09/038,035

[22] Filed: Mar. 11, 1998

[30] Foreign Application Priority Data

Jun. 30, 1997 [JP] Japan ..................................... 9-188980
Aug. 7, 1997 [JP] Japan ..................................... 9-225649

[51] Int. Cl.[7] .......................... C09K 19/54; C09K 19/52; G02F 1/13
[52] U.S. Cl. ...................... 428/1.5; 428/1.6; 252/299.01; 252/299.5; 516/900
[58] Field of Search ........................... 252/299.01, 299.5; 428/1.5, 1.6; 516/900

[56] References Cited

U.S. PATENT DOCUMENTS 4,790,961 12/1988 Wesis et al. ........................... 260/376
4,806,636 2/1989 Harris et al. ........................... 536/123
5,321,534 6/1994 Takatoh et al. ........................... 359/52
5,766,509 6/1998 Kawata et al. ..................... 252/299.01

FOREIGN PATENT DOCUMENTS 0 747 461  12/1996  European Pat. Off. .
43 03 033   8/1993  Germany .

OTHER PUBLICATIONS

A. Seeboth, et al., Colloid and Polymer Science, vol. 272, No. 3, pp. 348–351, "Thermotropic Liquid Crystals Embedded in a High Water Gel System", Mar., 1994.

*Primary Examiner*—Shean C. Wu

[57] ABSTRACT

A liquid crystal gel containing liquid crystal molecules and a gelling agent. The liquid crystal gel exhibits substantially no fluidity. Also provided are a gelling agent, particularly, 1,2-bis-(11-(4-cyanobiphenyl-4'-oxo)undecylcarbonylamino)cyclohexane, which is capable of easily producing the liquid crystal gel; a liquid crystal device made from the liquid crystal gel with substantially no fluidity; and a process for fabricating a liquid crystal device capable of providing this liquid crystal device rapidly in a simple manner.

10 Claims, 5 Drawing Sheets

6,074,710

LIQUID CRYSTAL GEL, GELLING AGENT, LIQUID CRYSTAL DEVICE, AND PROCESS FOR FABRICATING LIQUID CRYSTAL DEVICE

BACKGROUND OF THE INVENTION

1. Field of the Invention

The present invention relates to a liquid crystal gel, gelling agent, liquid crystal device, and a process for fabricating a liquid crystal device. More particularly, the present invention relates to a liquid crystal gel with substantially no fluidity, a gelling agent capable of easily producing the liquid crystal gel, a liquid crystal device made from the liquid crystal gel with substantially no fluidity, and a process for fabricating a liquid crystal device capable of providing this liquid crystal device rapidly in a simple manner.

2. Description of the Background Art

In recent years, liquid crystal devices (liquid crystal displays) including a light adjusting layer are enjoying wide popularity due to the advantage that a polarizing plate and orientation processing are not required to obtain superior brightness and clear contrast. In these types of liquid crystal devices, liquid crystal molecules are generally used as a material for the light adjusting layer. However, the liquid crystal molecules alone are not sufficient to satisfy a high-speed response which is increasingly demanded for the liquid crystal devices.

Because of this, a high polymer dispersion-type liquid crystal has been proposed. This high polymer dispersion-type liquid crystal principally has a structure with liquid crystal molecules distributed in a polymer wherein the optical transmission mechanism is thought to be of a light scattering mode which ensures more rapid response than individual use of liquid crystal molecules.

The high polymer dispersion-type liquid crystal is typically manufactured by polymerization method. Specifically, two sheets of substrate with an electrode, at least one of the sheets being transparent, for example, glass plates with an indium tin oxide film as an electrode formed thereon, are provided. A photopolymerizable monomer, as a liquid polymeric raw material, and liquid crystal molecules are introduced between the two sheets. Then, the photopolymerizable monomer is exposed to ultraviolet radiation or the like through the transparent substrate to induce polymerization, thereby producing a high polymer dispersion-type liquid crystal in which liquid crystal molecules are dispersed inaphotopolymerized high polymer (see, for example, Japanese Patent Applications Laid-open No. 340587/1994, No. 17910/1995, and No. 69983/1995).

However, this conventional process requires different materials which are the photopolymerizable monomer and the liquid crystal molecules to be introduced into a narrow space between the two sheets of substrate during the process for fabricating the liquid crystal device. It is difficult to introduce a liquid such as a liquid crystal into a narrow space between the two sheets of substrate homogeneously without causing air bubbles to be entrapped. In addition, such a procedure extends the period of time required for manufacturing and causes the production process to become complicated.

Moreover, it is not easy to uniformly polymerize a photopolymerizable monomer by ultraviolet radiation process. An additional problem is the difficulty in homogeneously mixing of the resulting polymer and the liquid crystal molecules.

Moreover, in order to maintain an accurate distance between two sheets of substrate, a spacer is added in a high polymer dispersion-type liquid crystal.

Still another problem is that the low viscosity of the liquid photo-polymerizable monomer and liquid crystal molecules makes it difficult to homogeneously disperse a spacer which is usually added to a high polymer dispersion-type liquid crystal to accurately maintain the distance between the two sheets of substrate.

In addition, when a photo-polymerizable monomer is used, it is necessary to provide an exposure step after introducing the photo-polymerizable monomer and liquid crystal molecules into the space between the two sheets of substrate. This requires a special exposure device, extending the manufacturing time, and makes the production process complicated.

In addition, when the liquid crystal device having a high polymer dispersion-type liquid crystal as a light adjusting layer is used for a decorative display plate such as an advertising plate, a display for a clock or an electric calculator, a display requiring a bright screen, particularly a display for a computer terminal, a display for a projection, or the like, such a device (a) must be driven by a sufficiently low voltage using a drive circuit which is commonly used at present and (b) must exhibit reduced hysteresis (a phenomenon in which the light transmittance shows different values during voltage increase and voltage decrease) which may result in a decrease of a time split drive margin and produce a problem in performing a gradation display.

SUMMARY OF THE INVENTION

Accordingly, an object of the present invention is to solve these points at issue and to provide a liquid crystal gel comprising liquid crystal molecules which are inherently fluid as a major component and a gelling agent, to make the liquid crystal molecules substantially non-fluid. The present invention also provides a liquid crystal device using this liquid crystal gel.

Specifically, the present invention is to provide a liquid crystal gel which markedly increases usability and eliminates complexity in the manufacture of liquid crystal devices using a conventional high polymer dispersion-type liquid crystal, as well as a liquid crystal device using this liquid crystal gel.

Another object of the present invention is to provide a gelling agent which is capable of gelatinizing liquid crystal molecules in a small amount.

Still another object of the present invention is to provide a process capable of manufacturing the liquid crystal device rapidly in a simple manner.

According to the present invention, the liquid crystal gel is characterized by possessing substantially no fluidity and comprising liquid crystal molecules and a gelling agent.

Inclusion of the liquid crystal molecules and gelling agent ensures that the liquid crystal molecules are substantially non-fluid and easy to handle and, at the same time, eliminates complexity in the production process.

In preparing the liquid crystal gel of the present invention, it is desirable to use a compound containing at least two functional groups capable of forming an intermolecular hydrogen bond and at least two alkylene groups as a gelling agent.

The addition of a small amount of such a gelling agent ensures production of a liquid crystal gel in which the liquid crystal molecules have substantially no fluidity.

Moreover, the gelling agent used for preparing the liquid crystal gel of the present invention is desirably a compound having a chiral structure. The gelation performance is remarkably increased by introducing a chiral structure into the gelling agent.

Furthermore, the gelling agent used for preparing the liquid crystal gel of the present invention is desirably a compound having a mesogen in a side chain. The gelation performance is improved by introducing a mesogen into a side chain of the gelling agent.

Still further, the gelling agent used for preparing the liquid crystal gel of the present invention is desirably a compound having an alkyl group containing four or more carbon atoms. The gelation performance is improved by limiting the carbon number of the alkyl group in the gelling agent in the above ways.

It is preferable that the gelling agent used in preparing the liquid crystal gel of the present invention be at least one compound selected from the group consisting of 1,2-bis-(11-(4-cyanobiphenyl-4'-oxo)undecylcarbonylamino) cyclohexane, 1,2-bis-(undecylcarbonylamino)cyclohexane, 1,2,3,4-dibenzylidene-D-sorbitol, 12-hydroxy stearic acid, N-lauroyl-L-glutamic acid-α,γ-bis-n-butylamide, spin-labeled steroids, cholesterol derivatives, aluminum dialkylphosphate, phenol-based cyclic oligomers, 2,3-bis-n-hexadecyloxyanthracene and cyclic depsipeptides.

The chemical structure of the 1,2-bis-(11-(4-cyanobiphenyl-4'-oxo)undecylcarbonylamino)cyclohexane is shown by the following formula (1).

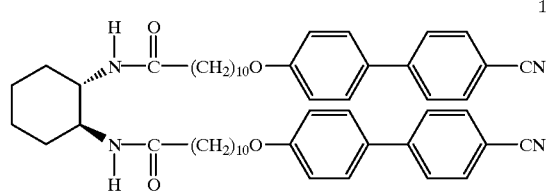

The chemical structure of the 1,2-bis-(undecylcarbonylamino)cyclohexane is shown by the following formula (2).

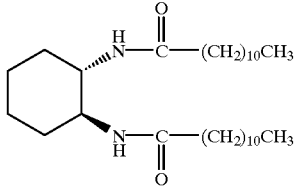

The chemical structure of the 1,2,3,4-dibenzylidene-D-sorbitol is shown by the following formula (3).

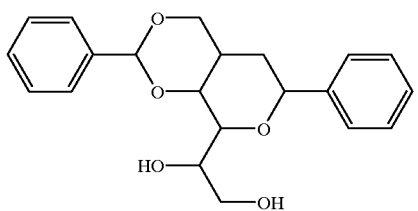

The chemical structure of the 12-hydroxy stearic acid is shown by the following formula (4).

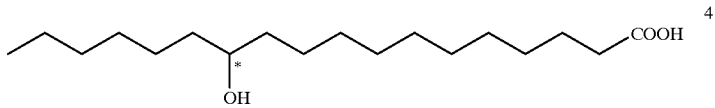

The chemical structure of the N-lauroyl-L-glutamic acid-α,γ-bis-n-butylamide is shown by the following formula (5).

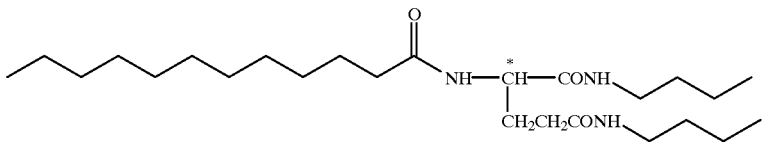

The chemical structure of the spin-labeled steroids is shown by the following formula (6).

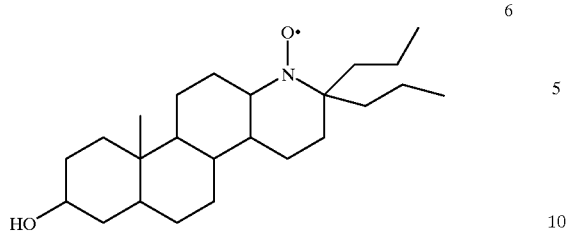

The chemical structure of the cholesterol derivatives are shown by the following formula (7) or (8).

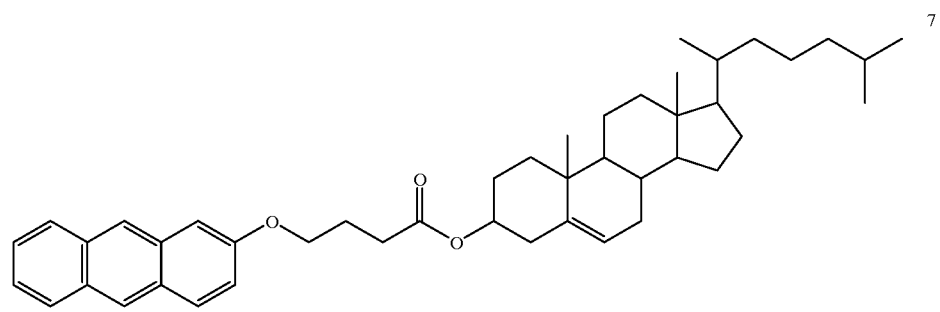

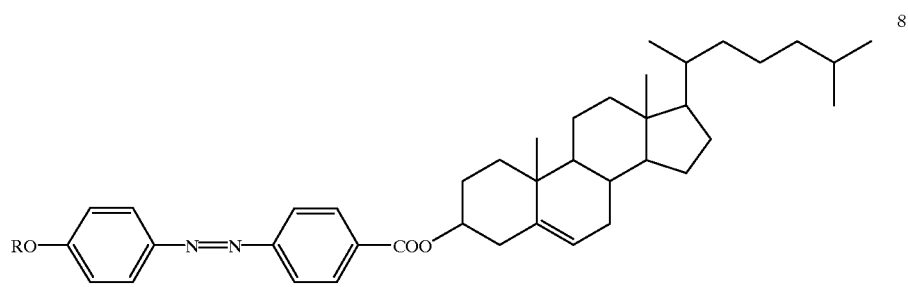

The chemical structure of the aluminum dialkylphosphate is shown by the following formula (9).

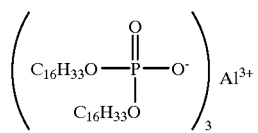

The chemical structure of the phenol-based cyclic oligomer is shown by the following formula (10).

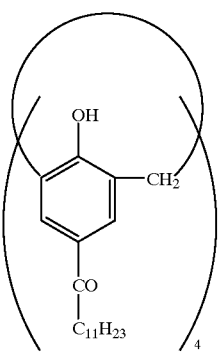

The chemical structure of 2,3-bis-n-hexadecyloxyanthracene is shown by the following formula (11).

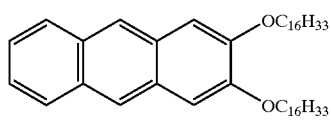

The chemical structure of the cyclic depsipeptides is shown by the following formula (12).

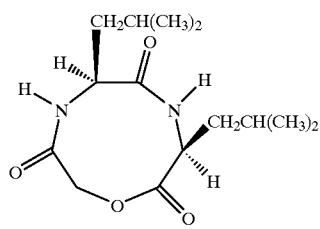

In preparing the liquid crystal gel of the present invention, it is desirable to use the gelling agent in an amount of about 0.01 to 20 mol % by weight for 100 mol % by weight of the total of the liquid crystal molecules and the gelling agent. Use of the gelling agent in an amount in this range ensures production of a homogeneous liquid crystal gel.

Furthermore, it is desirable to use a gelling agent with a molecular weight of about 2,000 or less. Excellent gelation performance is ensured by using a gelling agent with a molecular weight within this range.

In addition, it is desirable to use a biphenyl-type molecule, a phenylcyclohexane-type molecule, a phenylpyridine-type molecule, a cyclohexylcyclohexane-type molecule, or a mixture of two or more of these types of liquid crystal molecules in the preparation of the liquid crystal gel of the present invention.

It is particularly preferable that the liquid crystal molecule is at least one compound selected from the group consisting of 4-n-heptyloxy-4'-cyanobiphenyl, p-methoxybenzylidene-p'-butylaniline, 4-n-decanoxy-4'-cyanobiphenyl, 4-n-pentylox-4'-cyanobiphenyl and 4-n-pentyl-4'-cyanobiphenyl.

The chemical structure of the 4-n-heptyloxy-4'-cyanobiphenyl is shown by the following formula (13).

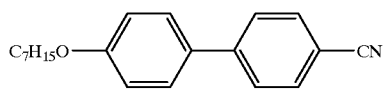

The chemical structure of the p-methoxybenzylidine-p'-butylaniline is shown by the following formula (14).

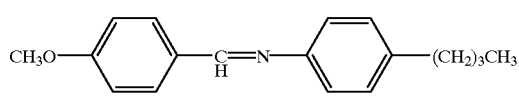

The chemical structure of the 4-n-decanoxy-4'-cyanobiphenyl is shown by the following formula (15).

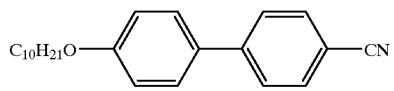

The chemical structure of the 4-n-pentyloxy-4'-cyanobiphenyl is shown by the following formula (16).

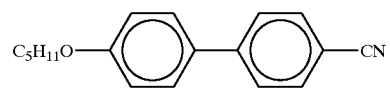

The chemical structure of the 4-n-pentyl-4'-cyanobiphenyl is shown by the following formula (17).

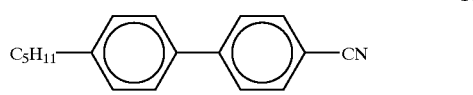

It is preferable that the liquid crystal gel of the present invention exhibit optical anisotropy within a temperature range from about −20 to 80° C. A practical liquid crystal device can be prepared from the liquid crystal gel exhibiting optical anisotropy within this temperature range.

In another feature, the present invention provides a gelling agent comprising a compound shown by the following formula (1), or a derivative thereof, or both. The compound shown by the above formula (1) and its derivatives exhibits particularly excellent gelling performance. The addition of a small amount of this compound or the derivative can gelatinize liquid crystal molecules to produce a liquid crystal gel.

In still another feature, the present invention provides a liquid crystal device comprising a light adjusting layer which is comprised of a liquid crystal gel containing liquid crystal molecules and a gelling agent. Such a liquid crystal gel containing liquid crystal molecules and a gelling agent is an ideal material for the light adjusting layer due to its thermoreversible properties and ease of handling.

In fabricating the liquid crystal device of the present invention, it is preferable to use a light adjusting layer with a thickness in the range of about 1 to 50 μm. A liquid crystal device with a light adjusting layer exhibiting superior contrast can be easily produced by limiting the thickness of the light adjusting layer to this range.

A liquid crystal display is one embodiment of use of the liquid crystal device of the present invention.

In another feature of the present invention, a process for fabricating a liquid crystal device is provided. The process comprises ① a step of preparing an isotropic solution which contains liquid crystal molecules and a gelling agent, ② a step of laminating(applying) a layer of the isotropic solution ona substrate, and ③ a step of forming a liquid crystal gel by cooling the laminated(applied) isotropic solution to a temperature range wherein the laminated layer becomes a liquid crystal gel. This process ensures rapid and simple fabrication of the liquid crystal devices.

Other and further objects, features and advantages of the present invention will appear more fully from the following description.

DETAILED DESCRIPTION OF THE INVENTION AND PREFERRED EMBODIMENTS

Figure 1:
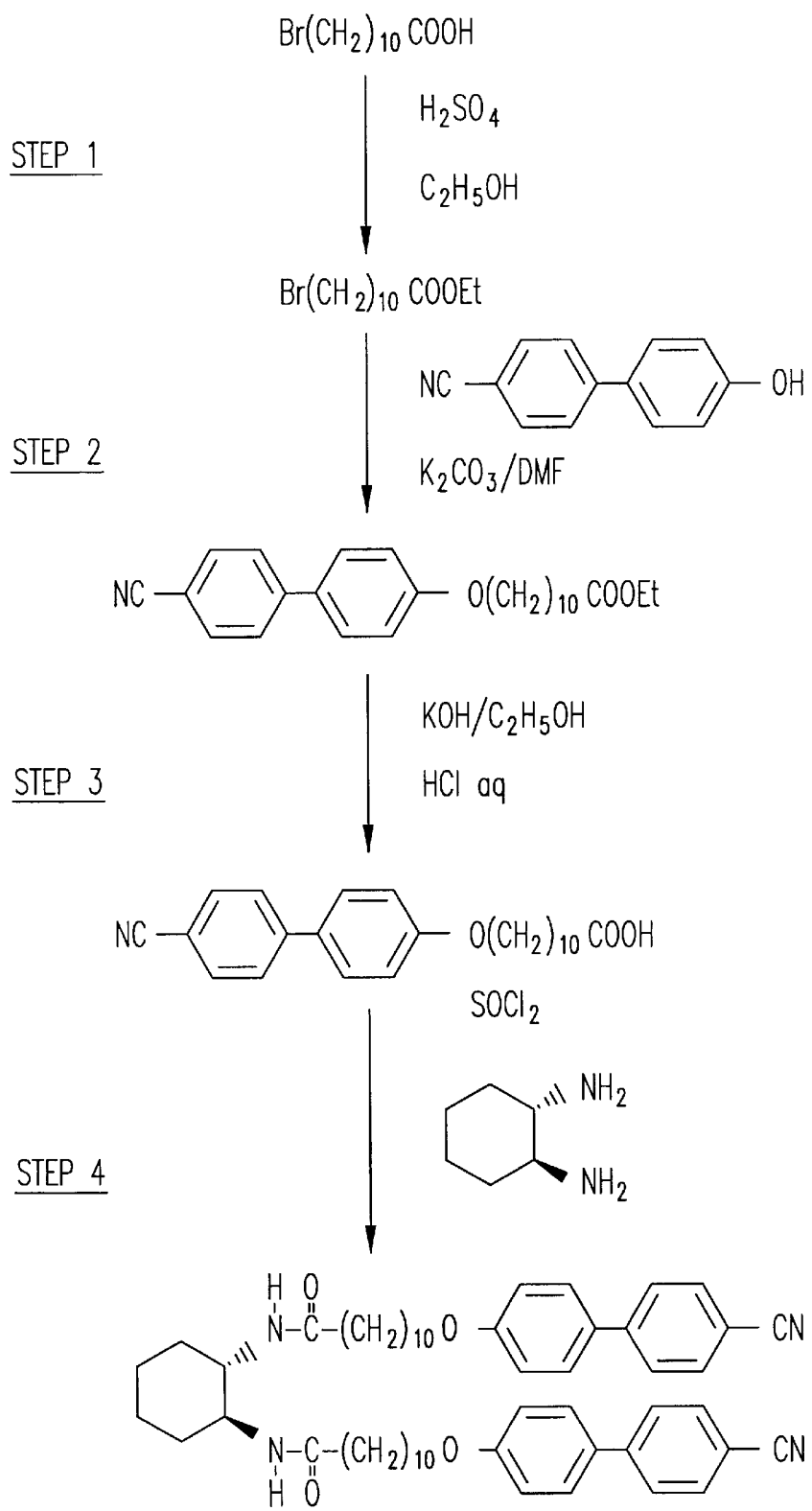
FIG. 1 is a flow chart showing an embodiment of the process for synthesizing the gelling agent.

The liquid crystal gel of the present invention contains liquid crystal molecules commonly used for a liquid crystal display, for example, as a principal component. The liquid crystal molecules which are inherently fluid are gelatinized as a whole and become non-fluid by the action of a coexisting gelling agent. Thus, the liquid crystal gel can be prepared and handled with ease.

In addition, the liquid crystal gel of the present invention shows thermoreversible optical anisotropy which enables liquid crystal molecules included in the liquid crystal gel to be oriented causing them to display a specified image.

Liquid Crystal Molecules (1) Type

Any liquid crystal molecules which are commonly used for liquid crystal displays can be used in the present invention without specific limitation. Preferred general liquid crystal molecules are, for example, those described in "Liquid Crystal Device Handbook" edited by the Japanese Scientific Promotion Association, 142nd Committee (1989), pages 154–192, 715–722, and include a biphenyl-type molecule, a phenylcyclohexane-type molecule, a phenylpyridine-type molecule, a cyclohexylcyclohexane-type molecule, or a mixture of two or more of these types of liquid crystal molecules.

As mentioned above, particularly preferred liquid crystal molecules are 4-n-heptyloxy-4'-cyanobiphenyl of the formula (13), and p-methoxybenzylidene-p'-butylaniline of the formula (14) and the like. These liquid crystal molecules exhibit superior mutual solubility with gelling agents and are easily gelatinized to produce liquid crystal gels. Moreover, these liquid crystal molecules exhibit a high-speed response to voltage. In addition, the use of these liquid crystal molecules ensures production of a liquid crystal gel which can show optical anisotropy in a wide temperature range.

Gelling Agent (1) Effect

The gelling agent of the present invention is considered to exhibit the following effects:

(a) The functional group capable of forming hydrogen bonds exhibits intermolecular effect which causes a plurality of gelling agent molecules to associate, resulting in formation of macrofibrous associations.

(b) These macrofibrous associations are bonded together by Van der Waals force or the like to form a three dimensional network structure.

(c) Liquid crystal molecules are incorporated into this network structure to produce a liquid crystal gel.

These effects of the gelling agent ensure efficient gelation of liquid crystal molecules by the addition of a small amount of the gelling agent. Moreover, the resulting liquid crystal gel can exhibit thermoreversible optical anisotropy.

(2) Type

It is desirable that the gelling agent used in the present invention has at least two functional groups capable of forming intermolecular hydrogen bonds and at least two alkylene groups in the molecule.

The existence of two or more functional groups capable of forming intermolecular hydrogen bonds enables the gelling agent to produce a liquid crystal gel with ease and existence of two or more alkylene groups improves the gelling performance.

There are no specific limitations to the group which is capable of forming intermolecular hydrogen bonds. An amide bond shown by the formula —NHCO— can be given as a typical example.

An alkylene group having 4 or more carbon atoms, particularly 6 to 20 carbon atoms, is preferably used. Specific examples are an ethylene group, butylene group, trimethylene group, propylene group, pentylene group, hexylene group, heptylene group, octylene group, and groups shown by the formula —$CH_2(CH_2)_nCH_2$—, wherein the recurring number n is preferably an integer from 0 to 20.

Also, there are no specific limitations to the molecular weight of the gelling agent. Preferably, the gelling agent has a molecular weight of about 2000 or less. If the molecular weight is 2000 or less, orientation of liquid crystal molecules will not be hindered, yet the liquid crystal gel can be produced with ease. To provide superior gelling performance, the molecular weight of the gelling agent should preferably be in the range of 150–1000.

The molecular weight here denotes a polystyrene-conversed molecular weight measured by gel permeation chromatography (GPC).

Moreover, it is desirable that the gelling agent be a compound having a chiral structure. Possession of the chiral structure in the molecule remarkably improves gelling performance of the gelling agent. If the gelling agent has no chiral structure, the agent exhibits only a poor gelling performance and a large amount of the gelling agent may be required to form a liquid crystal.

Furthermore, it is desirable that the gelling agent be a compound possessing a mesogenic structure (rigid structure) in a side chain. Possession of the mesogenic structure in a side chain increases the gelling performance and ensures that only a small amount of gelling agent is required to produce a liquid crystal gel.

As previously mentioned, 1,2-bis-(11-(4-cyanobiphenyl-4'-oxo)undecylcarbonylamino)cyclohexane shown by the formula (1) and the like can be given as specific examples of the gelling agent. The 1,2-bis-(11-(4-cyanobiphenyl-4'-oxo)undecyl-carbonylamino) cyclohexane compound of the formula (1) is a novel compound. This compound has two mesogens (rigid structures) in the side chain and is an optimum gelling agent of the present invention.

(3) Content

Although the specific amount of the gelling agent necessary to produce the liquid crystal molecule gel varies according to the kind of liquid crystal molecules and gelling agent, the amount of gelling agent used is preferably in the range of about 0.01 to 20 mol % by weight for 100 mol % by weight of the total of the liquid crystal molecules and the gelling agent. If less than 0.01 mol %, there is the possibility that it becomes difficult for the gelling agent to efficiently gelatinize the liquid crystal molecules. If more than 20 mol %, on the other hand, there is the possibility that separation of the liquid crystal and gelling agent is remarkable so that a homogeneous liquid crystal gel can be obtained only with difficulty.

Therefore, taking the balance of efficient gelation of the liquid crystal molecules and production of a homogeneous liquid crystal gel into consideration, an amount of gelling agent in the range of about 0.1–10 mol % is more preferred.

Liquid Crystal Gel (1) Properties

A liquid crystal gel exhibiting optical anisotropy within a temperature range of 30° C. to 80° C. can be obtained from a homogeneously mixed isotropic solution containing liquid crystal molecules and the gelling agent.

For example, as shown more specifically by examples hereinafter, when 4-n-heptyloxy-4'-cyanobiphenyl of the formula (14) is used as the liquid crystal molecule and 1,2-bis-(11-(4-cyano biphenyl-4'-oxo) undecylcarbonylamino)cyclohexane of the formula (1) is used as the gelling agent, a liquid crystal gel showing optical anisotropy within the temperature range from 32.5° C. to 71.5° C. can be obtained by cooling the homogeneously mixed isotropic solution containing these components. If heated again, this liquid crystal gel can return to an isotropic solution. The liquid crystal gel is restored by again cooling the isotropic solution. The liquid crystal gel of the present invention is thermally reversible in this way.

(2) Manufacturing process

Although there are no specific limitations to the process for manufacturing the liquid crystal gel of the present invention from the liquid crystal molecules and gelling agent, the following process can be given as a typical example.

① A homogeneous solution is prepared by mixing prescribed amounts of liquid crystal molecules and gelling agent. Mixing is performed using a propeller mixer or a high speed shear agitator, for example, at a rotation speed of 100–100000 rpm at 50–150° C. for 1 to 100 minutes, although specific conditions vary according to the clearing temperature and the kind of liquid crystal.

② Next, the resulting solution is made into a homogeneous isotropic solution by heating. The heating is preferably carried out, for instance, at a temperature from 50 to 150° C. for 1 to 100 minutes.

③ The resulting isotropic solution is then cooled to produce a liquid crystal gel which exhibits optical anisotropy. The cooling of the isotropic solution is carried out, for instance, at a temperature from 10 to 30° C. for 10 to 100 minutes.

(3) Form of liquid crystal gel

The liquid crystal gel thus obtained can be made into various forms such as a film, sheet, or any other optional form. The liquid crystal gel of the present invention therefore can be used as appropriate conforming to the form of the liquid crystal device such as a liquid crystal display, actuator, or recording material.

Liquid Crystal Device (1) Structure

The structure of the liquid crystal device of the present invention is now described. There are no specific limitations to the structure of the liquid crystal device inasmuch as the device has a light adjusting layer containing the above-mentioned liquid crystal gel incorporated therein. Accordingly, except for the material for the light adjusting layer, exactly the same structure is applicable as a liquid crystal device made using a conventional high polymer dispersion-type liquid crystal as the light adjusting layer.

Figure 5:
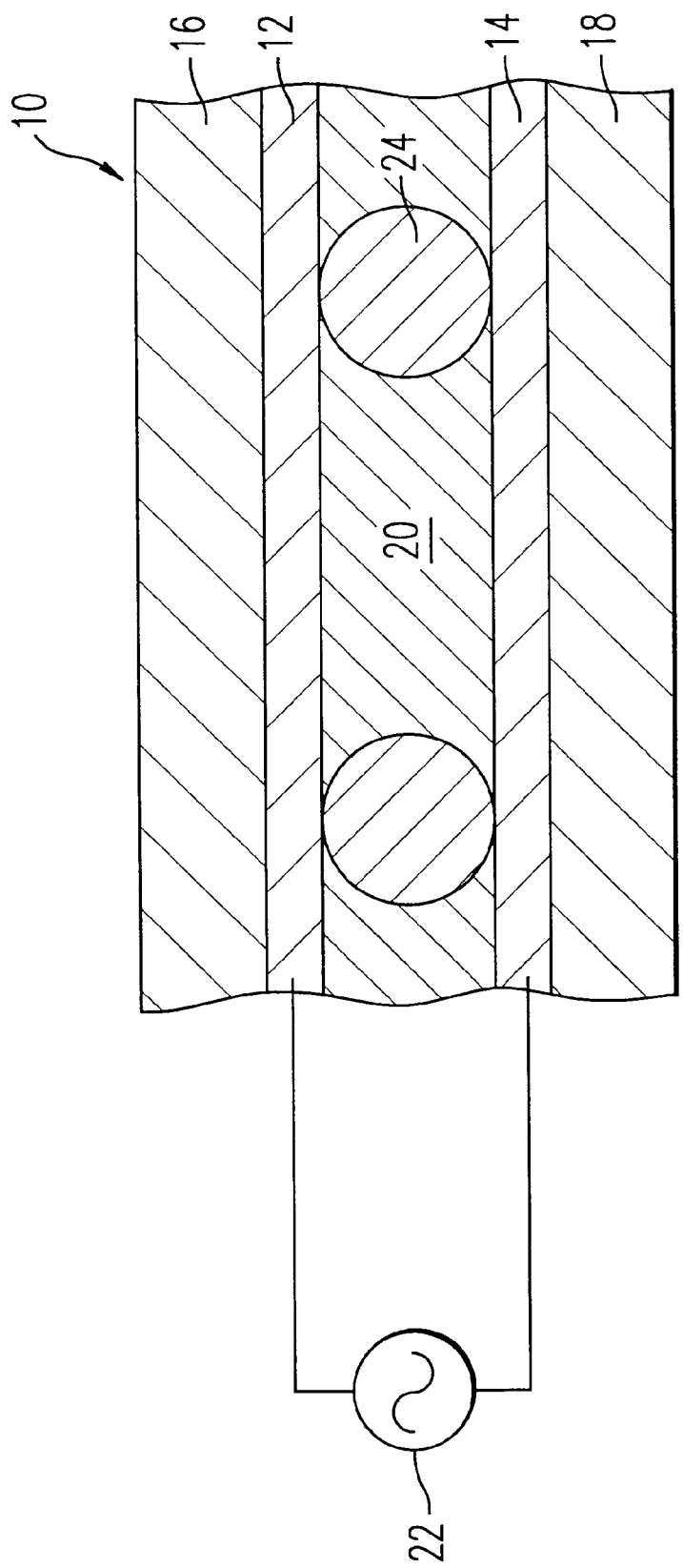
FIG. 5 is a cross-sectional view of the liquid crystal device of the present invention.

Now, this structure is described referring to FIG. 5 which shows a sectional view of the liquid crystal device 10 of the present invention. The liquid crystal device 10 is provided with electrode layers 12, 14 on its surface to which a fixed voltage is applied. Two substrate sheets 16 and 18, at least one of which is transparent, are placed in opposition at a certain distance from one another. A liquid crystal gel 20 is inserted into the space between these two substrate sheets 16, 18 as a light adjusting layer. The surrounding area between the substrate sheets 16, 18 is then sealed. A prescribed voltage is applied between the electrode layer 12 and the other electrode layer 14 from an external power supply source 22 to orient the liquid crystal gel, thereby driving the liquid crystal device 10 of the present invention.

Here, it is possible to provide a spacer 24 (particles, a plate, or a column) to maintain a space between the two substrate sheets 16, 18 in the same manner as in conventional liquid crystal devices. The liquid crystal gel 22 of the present invention possesses an extremely high viscosity so that it is also possible to handle it as a film. Thus, the spacer 24 can be accurately placed in a fixed position.

Because the liquid crystal gel 20 of the present invention can excellently maintain its shape, the two substrate sheets 16, 18 can be maintained with a certain distance between them without installing the spacer 24.

The substrate sheets 16, 18 may consist of a rigid material such as glass or metal, or they may be made of a flexible material such as a plastic film.

Although there are no specific limitations to the thickness of the substrate sheets 16, 18, they may have a thickness, for example, in the range from 0.01 to 10 mm, preferably from 0.1 to 1 mm.

In addition, it is desirable that at least one of the two substrate sheets 16, 18 is transparent. Here, "transparent" does not necessarily mean perfect transparency. It is sufficient that the substrate be transparent to a degree required according to the purpose of use of the liquid crystal device. However, when the liquid crystal device 10 of the present invention is used to exhibit an action on the light coming to one side of the device from another side, both the substrate sheets 16, 18 must have significant transparency.

The substrate sheets 16, 18 may further be provided either over part or all of their surfaces with electrode layers 12, 14 which may be either transparent or opaque according to the purpose of use.

When the liquid crystal device of the present invention is used as a computer terminal display or a projector display, it is also desirable to provide an active element on the electrode layer on the supporting body as a consistent part of a TFT structure.

The thickness of the light adjusting layer is appropriately selected according to the purpose of use of the liquid crystal device of the present invention. To ensure sufficient contrast in the cases when the light adjusting layer is opaque due to scattering light and when the light adjusting layer becomes transparent with substantially no scattering light, the thickness of the light adjusting layer should preferably be in the range from about 1 to 50 $\mu$m, and particularly preferably in the range from 5 to 25 $\mu$m.

(2) Fabricating process

Processes for fabricating the liquid crystal device of the present invention are now explained. Although not specifically limited, the following processes 1 to 3 are given as typical examples for fabricating the liquid crystal device of the present invention.

(Process 1)

① An isotropic solution comprising liquid crystal molecules and a gelling agent is prepared.

② The resulting isotropic solution is laminated(applied) over one of the supporting bodies (substrate).

③ The laminated layer is cooled to a temperature to change the isotropic solution into a liquid crystal gel thereby producing a liquid crystal gel as the light adjusting layer.

④ Another substrate is layered, optionally through a spacer, on top of the formed liquid crystal gel, thereby obtaining a liquid crystal device.

According to this Process 1 for fabricating the liquid crystal device, the liquid crystal gel can be treated as a film so that the fabrication operation is very simple. In addition, because one of the supporting bodies can be used as the substrate to which the isotropic solution is applied, the liquid crystal gel need not be transferred. Therefore, the number of overall production steps can be reduced.

(Process 2)

① An isotropic solution comprising liquid crystal molecules and a gelling agent is prepared.

② The resulting isotropic solution is laminated over a releasable plate.

③ The laminated layer is cooled to a temperature to change the isotropic solution into a liquid crystal gel, thereby producing a liquid crystal gel.

④ The resulting liquid crystal gel is peeled from the releasable plate and placed on one of the supporting bodies (substrate).

⑤ Another substrate is layered, optionally through a spacer, on top of the liquid crystal gel, thereby providing a liquid crystal device.

Using this Process 2 for fabricating the liquid crystal device, a large amount of liquid crystal gel or a liquid crystal gel with a large area can be prepared in advance. Therefore, it is possible to manufacture a liquid crystal gel with uniform characteristics at a low manufacturing cost.

(Process 3)

① An isotropic solution comprising liquid crystal molecules and a gelling agent is prepared.

② The resulting isotropic solution is laminated over one of the supporting bodies (substrate).

③ Immediately after the lamination of the step ② above, another substrate is laminated in such a manner that the substrate comes into contact with the laminated layer of the isotropic solution.

④ The laminated layer is cooled to a temperature to change the isotropic solution into a liquid crystal gel, thereby producing a liquid crystal gel as the light adjusting layer.

This Process 3 ensures avoiding the risk of air bubbles becoming entrapped in the liquid crystal gel.

When the isotropic solution is laminated in the Processes 1 to 3, it is desirable to apply the solution uniformly using an applicator, spin coater, bar coater, or roll coater.

The operation for laminating the second sheet of substrate is preferably performed under reduced pressure to avoid the risk of air bubbles becoming entrapped in the liquid crystal gel, for instance, under a pressure in the range from about 10 to 500 torr. In Process 2, however, entrapment of air bubbles can be avoided by laminating the layer of liquid crystal gel while applying pressure using a laminator or the like.

The liquid crystal device is preferably sealed using a sealing resin after the substrates are laminated. Sealing of the substrates not only increases durability of the liquid crystal device, but also effectively prevents the liquid crystal gel from oozing out.

The liquid crystal device of the present invention thus fabricated can be used for the same applications as the liquid crystal devices using a conventional high polymer dispersion-type liquid crystal as a light adjusting layer. Examples include a screen to cut off the field of view such as a window for buildings or a show-window; a decorative display plate for advertisements; a display for a clock or electric calculator; a computer terminal display, and a projector display.

Other features of the invention will become apparent in the course of the following description of the exemplary embodiments which are given for illustration of the invention and are not intended to be limiting thereof.

EXAMPLES

Example 1

(Synthesis of gelling agent)

1,2-bis-(11-(4-cyanobiphenyl-4'-oxo) undecylcarbonylamino)cyclohexane with the formula (1) was synthesized as a gelling agent according to the reaction formula shown in FIG. 1. The reaction conditions of steps 1–4 were as follows.

(1) Step 1

The following raw materials were subjected to the esterification reaction under reflux conditions for 24 hours using sulfuric acid as catalyst to obtain ethyl bromoundecylate.

Bromoundecylic acid: 21.0 g; Sulfuric acid: 6 ml; Ethanol: 200 ml (2) Step 2

The ethyl bromoundecylate obtained in step 1 was reacted under refluxing conditions for 24 hours to obtain ethyl 11-(4-cyanobiphenyl-4'-oxy)undecylate which is the target compound. The yield was about 50%.

Bromoundecylic acid: 11.6 g; 4-cyano-4'-hydroxy biphenyl: 7.6 g; Potassium carbonate: 8.6 g; Dimethylformamide: 50 ml (3) Step 3

Ethanol solution with 1.4 g of potassium hydroxide dissolved therein was added to 7.7 g of ethyl 11-(4-cyanobiphenyl-4'-oxy)undecylate obtained in step 2. The mixture was reacted under reflux conditions for 24 hours to obtain 11-(4-cyanobiphenyl-4'-oxy)undecanoic acid which is the target compound. The yield was about 74%.

(4) Step 4

Two drops of dimethylformamide were added to 1.71 g of 11-(4-cyanobiphenyl-4'-oxy)undecanoic acid obtained in Step 3, followed by further addition of 10 ml of thionyl chloride.

The mixture was stirred at room temperature for 30 minutes. After removal of thionyl chloride by volatilization, 20 ml of dry THF was added to the residue and dissolved. Then, 0.28 g of 1,2-cyclohexanediamine and 0.63 ml of triethylamine were added while cooling with water.

Next, the mixture was reacted for 3 hours while stirring to obtain the product, which was fractionated by column chromatography and purified by recrystallization.

(Analysis of gelling agent)

The resulting purified compound was subjected to NMR measurement and IR analysis.

As a result, this compound was identified as 1,2-bis-(11-(4-cyanobiphenyl-4'-oxo)undecylcarbonylamino) cyclohexanel of the formula (1). Separate experiments confirmed that liquid crystal molecules can be gelled efficiently using a small amount of this gelling agent.

Example 2

4-n-heptyloxy-4'-cyanobiphenyl shown by the formula (12) and 1,2-bis-(11-(4-cyanobiphenyl-4'-oxo) undecylcarbonyl-amino) cyclohexane shown by the formula (1) were used as liquid crystal molecules and gelling agent, respectively. 14 kinds of liquid crystal gels were prepared, each having a different content of gelling agent in the range from 0.1 to 12 mol %.

Specific amounts of liquid crystal molecules and gelling agent were placed in a container and mixed by stirring using a propeller mixer at 1000 rpm for 10 minutes at a temperature higher than the temperature of the isotropic solution to obtain a homogeneous solution. The resulting solution was heated using an oven at 100° C. for 5 minutes to obtain a homogeneous isotropic solution. This isotropic solution was then cooled using a cooler for 10 minutes at 23° C. to obtain a liquid crystal gel which exhibits optical anisotropy.

The phase transformation behavior of the resulting liquid crystal gel was observed as follows.

(1) Using a differential scanning calorimeter (DSC), the liquid crystal gel was heated from room temperature to 150° C. at a rate of temperature rise of 15° C./min. A homogeneous isotropic solution of the liquid crystal gel thus obtained was gradually cooled while observing peaks of heat generation.

(2) The liquid crystal gel was cooled from 150° C. at a rate of 5° C./min using the DSC, while observing phase behavior of the liquid crystal gel with a polarization microscope.

Figure 2:
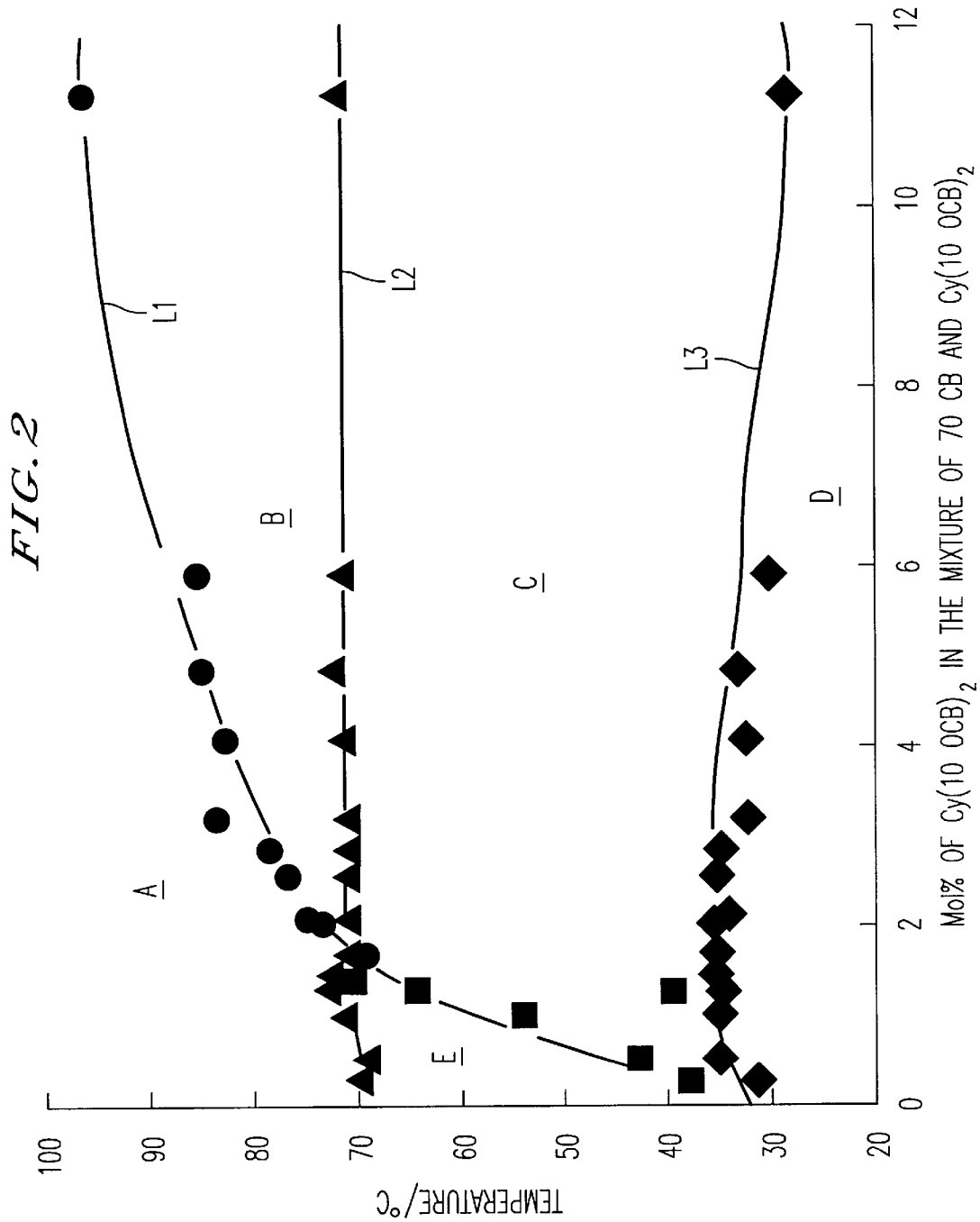
FIG. 2 is a drawing showing a phase behavior of liquid crystal gel determined by the relationships between the ratio of the gelling agent (mol %) and temperature.
Figure 3:
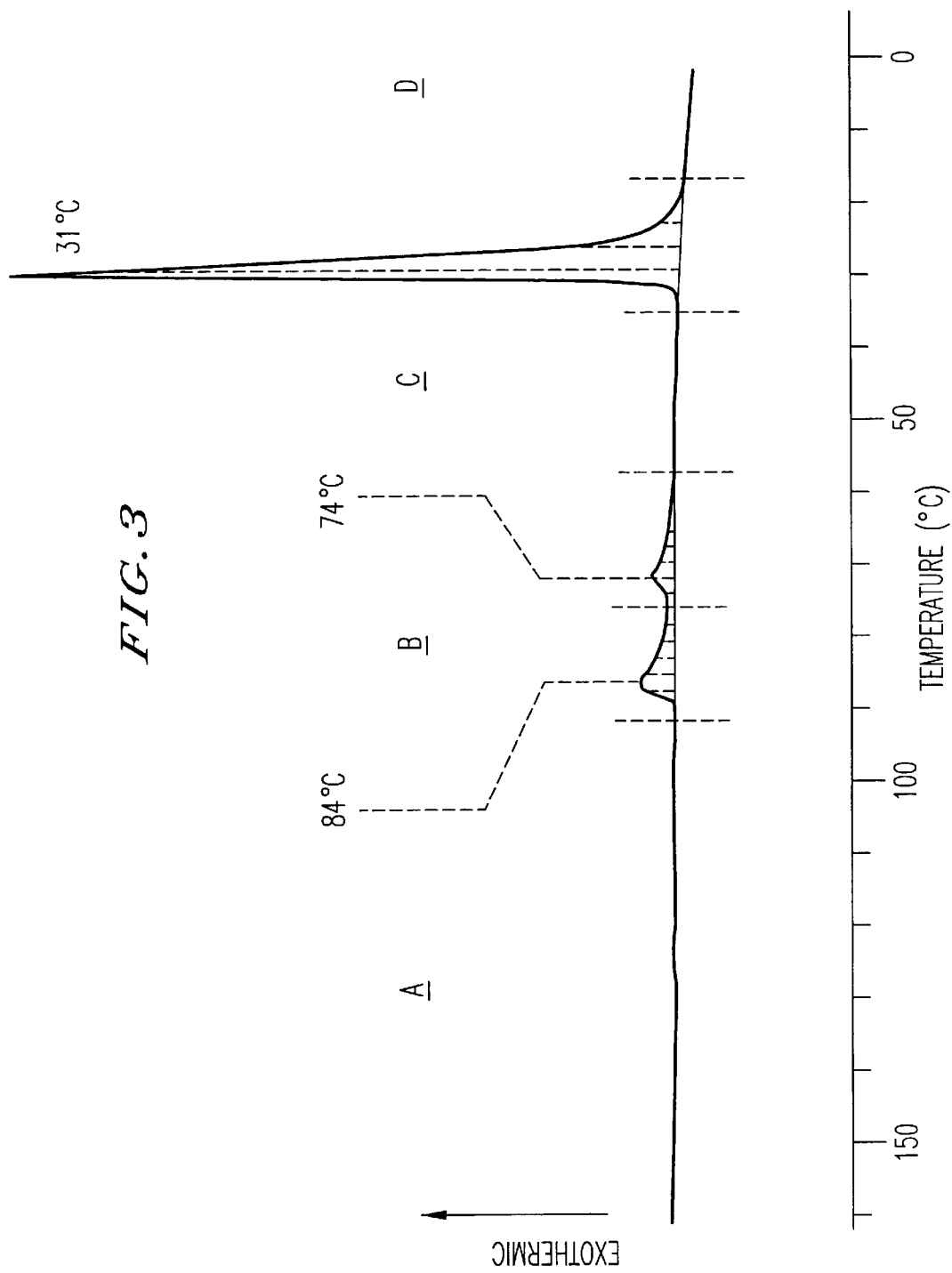
FIG. 3 is a DSC chart (during temperature decrease) of the liquid crystal gel.

The results are shown in FIGS. 2 and 3. FIG. 2 shows the phase behavior of the liquid crystal gel (isotropic solution region, isotropic gel region, liquid crystal gel region, crystal region, and cholestric phase region) determined from the relationships between the ratio of the gelling agent (mol %) and temperature.

In the FIG. 2, the isotropic solution region is indicated by A, the isotropic gel region by B, the liquid crystal gel region by C, the crystal region by D, and the cholestric phase region by E. The boundary of the isotropic solution region A and the isotropic gel region B is shown by a line L1; the boundary of the isotropic gel region B and liquid crystal gel region C is shown by a line L2; and the boundary of the liquid crystal gel region C and the crystal region D is shown by a line L3.

These regions are heat reversible, appearing in turn by repetition of heating and cooling. The mixture in the isotropic solution region A is a liquid exhibiting fluidity. When the temperature becomes low, the isotropic gel region B emerges, where the gel exhibits low fluidity. When the temperature continues to decrease the state of the liquid crystal gel region C emerges, where the mixture retains a state of gel exhibiting substantially no fluidity.

FIG. 3 is a DSC chart (during temperature decrease) of the liquid crystal gel containing the gelling agent in an amount of 3.0 mol %. The temperature (° C.) is taken along the horizontal axis, while the peaks of heat generation are plotted along the vertical axis. The symbols A to D in FIG. 3 correspond to those in FIG. 2.

As can be clearly understood from FIG. 3, when the temperature is lowered from approximately 160° C. at a constant rate (5° C./min.), a small heat generation peak appears around 84° C. indicating transformation of the isotropic solution region exhibiting fluidity into the isotropic gel region where the gel exhibits reduced fluidity. When the temperature is further lowered, another small heat generation peak indicating the temperature at which the gel substantially lost fluidity was observed around 74° C. When the temperature is further lowered, a remarkable heat generation peak was observed near 31° C., indicating the temperature at which transformation from the liquid crystal gel region into the crystal region took place.

Figure 4:
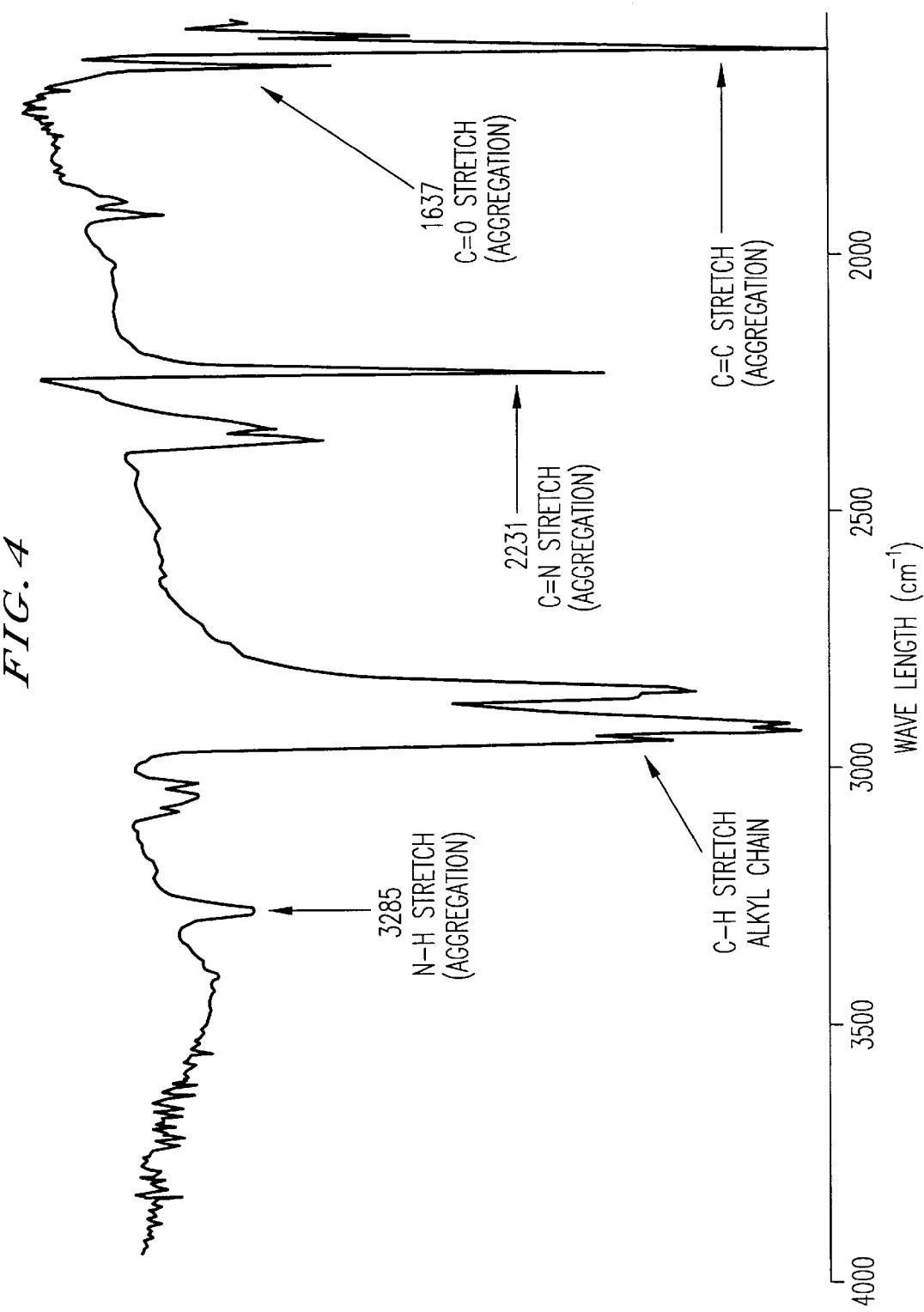
FIG. 4 is an IR spectrum chart of the liquid crystal gel of the present invention.

FIG. 4 is an IR spectrum chart of the liquid crystal gel containing 4.0 mol % of the gelling agent at 50° C., wherein the wave number (cm$^{-1}$) is taken along the horizontal axis and the IR absorption ratio (%) along the vertical axis.

As can be clearly understood from this IR spectrum, characteristic absorption peaks appear at wave numbers 3285 cm$^{-1}$ and 1637 cm$^{-1}$. The former is the absorption corresponding to the N—H stretch and the latter to the C=O stretch. These two absorption peaks do not appear unless molecules of the gelling agent associate. In other words, the two peaks indicate that gelling agent molecules are associated via hydrogen bonds.

As described above, the present invention provides a novel material of the liquid crystal gel which comprises liquid crystal molecules and a small amount of low molecular weight gelling agent. In addition, Example 2 demonstrates that a liquid crystal gel with excellent usability can be provided using a gelling agent possessing a mesogen in the side chain, specifically, by a combination of a diamidecyclohexane derivative having a mesogenic structure in the side chain and a cyanobiphenyl compound.

Examples 3–5

Liquid crystal gels were prepared using 4-n-heptyloxy-4'-cyanobiphenyl as the liquid crystal molecule and 1,2-bis-(undecylcarbonylamino)cyclohexane as the gelling agent (Example 3), p-methoxybenzylidene-p'-butylaniline as the liquid crystal molecule and 1,2-bis-(undecylcarbonylamino) cyclohexane as the gelling agent (Example 4), and 4-n-decanoxy-4'-cyanobiphenyl-4-n-heptyloxy-4'-cyanobiphenyl as the liquid crystal molecule and 1,2-bis-(undecylcarbonylamino) cyclohexane as the gelling agent (Example 5).

The resulting three liquid crystal gels were evaluated in the same manner as in Example 2. As a result the liquid crystal gel of Example 3 was confirmed to exhibit optical anisotropy when containing the gelling agent in an amount from 0.8 to 9 mol % at a temperature from 25 to 70° C. The liquid crystal gel was further confirmed to be thermoreversible. The liquid crystal gel of Example 4 was confirmed to exhibit optical anisotropy when containing the gelling agent in an amount from 0.4 to 9 mol % at a temperature from −15 to 40° C. This liquid crystal gel was also confirmed to be thermoreversible. The liquid crystal gel of Example 5 was confirmed to exhibit optical anisotropy when containing the gelling agent in an amount from 0.8 to 9 mol % at a temperature from 32 to 80° C., and also to be thermoreversible.

Example 6

(Preparation liquid crystal gel)

12.25 g of 4-n-pentyl-4'-cyanobiphenyl, as the liquid crystal molecule, and 0.25 g of 1,2-bis-(undecylcarbonylamino) cyclohexane, as the gelling agent, were dissolved in 100 g of methylene chloride at room temperature to produce a homogeneous solution. The methylene chloride was volatilized by drying in a flow of air to obtain a homogeneous liquid crystal gel comprising the gelling agent and liquid crystal molecules.

This liquid crystal gel was heated at a rate of 1° C. per minute to confirm that the liquid crystal gel is transformed into an isotropic solution at 34.4° C. by a phase transition. On the other hand, when cooling at a rate of 1° C. per minute, this liquid crystal gel was transformed from the isotropic solution into a liquid crystal gel by phase transition at 34.3° C. The gel stably maintained the state of liquid crystals at room temperature exhibiting no fluidity.

(Fabrication of liquid crystal device)

A liquid crystal device was fabricated using the liquid crystal gel prepared by the above method as a light adjusting layer according the following process (a) or (b).

(a) A spacer consisting of particles with an average particle diameter of 16 m was placed between two sheets of glass substrate (20×50 mm$^2$) having electrode layers. Next, the liquid crystal gel was heated and introduced as an isotropic solution, and gradually cooled to room temperature, thereby providing a liquid crystal device with a liquid crystal gel having no fluidity as a light adjusting layer.

Because the liquid crystal gel can be inserted in a liquid state in this process, entrapment of air bubbles can be minimized.

(b) A liquid crystal gel heated to assume a state of an isotropic solution was applied to a glass substrate (20×50 mm$^2$) having an electrode layer using a bar coater, and gradually cooled to room temperature to produce a liquid crystal gel layer with a uniform film thickness. Over this glass substrate another glass substrate having an electrode layer was laid to obtain a liquid crystal device having a light adjusting layer made from the liquid crystal gel with substantially no fluidity.

According to this process, a liquid crystal gel can be inserted between the glass substrates in a non-fluid state so that the fabrication operation such as arrangement of spacers can be carried out with ease. It was confirmed that air bubbles were effectively prevented from being entrapped by performing the fabrication operation while applying pressure to the glass substrates.

(Evaluation of liquid crystal device)

The liquid crystal device was evaluated according to the following method in conformity to JIS C7072.

(1) Driving voltage

Voltages of the device allowing light transmittance of 90% ($V_{90}$ volt) and 10% ($V_{10}$ volt) were measured, assuming the light transmittance (T) of the device when no voltage is applied to be 0% and the light transmittance (T10) when no more increase in the light transmittance is observed when the applied voltage was increased to be 100%. If $V_{90}$ and $V_{10}$ are no more than 20 volt, the drive voltage is judged to be sufficiently low to withstand practical use.

(2) Contrast

The device was removed from the photometry system to measure light transmittance when no voltage was applied ($T_0$) and the light transmittance when the voltage $V_{90}$ measured in (1) above was applied ($T_{90}$), assuming that the light transmittance is respectively 100% and 0% when the light source is on and off. The contrast was calculated from the following formula.

$$Contrast = T_{90}/T_0$$

The larger the value of the contrast, the better the performance of the device.

The results of the measurement are shown in Table 1. In this Example 6, measurement was carried out for a black object displayed on a white background.

TABLE 1

|  | Driving voltage $V_{90}$ (volt) | Driving voltage $V_{10}$ (volt) | Contrast ($T_{90}/T_0$) |
|---|---|---|---|
| Process (a) | 18 | 8 | 11/1 |
| Process (b) | 18 | 7 | 12/1 |

Example 7

(Preparation of liquid crystal gel)

14.9 g of 4-n-pentyl-4'-cyanobiphenyl, as the liquid crystal molecule, and 0.167 g of 1,2-bis-(11-(4-cyanobiphenyl-4'-oxo)undecylcarbonylamino)cyclohexane, as the gelling agent, were dissolved in 100 g of methylene chloride at room temperature to produce a homogeneous solution. The methylene chloride was volatilized by drying in a flow of air to obtain a homogeneous liquid crystal gel comprising the gelling agent and liquid crystal molecules.

This liquid crystal gel was heated at a rate of 1° C. per minute to confirm that the liquid crystal gel was transformed into an isotropic solution at 34.5° C. by a phase transition. On the other hand, when cooling at a rate of 1° C. per minute, this liquid crystal gel was transformed from the isotropic solution into a liquid crystal gel by phase transition at 34.3° C. The gel stably maintained the liquid crystal state at room temperature, exhibiting no fluidity.

(Fabrication and evaluation of liquid crystal device)

A liquid crystal device having a light adjusting layer consisting of the liquid crystal gel produced above was prepared by the process (b) in the Example 6 and evaluated in the same manner as in Example 6. The results are shown in Table 2.

Example 8

(Preparation of liquid crystal gel)

14.9 g of 4-n-pentyl-4'-cyanobiphenyl, as the liquid crystal molecule, and 0.334 g of 1,2-bis-(11-(4-cyanobiphenyl-4'-oxo)undecylcarbonylamino)cyclohexane, as the gelling agent, were dissolved in 100 g of methylene chloride at room temperature to produce a homogeneous solution. The methylene chloride was volatilized by drying in a flow of air to obtain a homogeneous liquid crystal gel comprising the gelling agent and liquid crystal molecules.

This liquid crystal gel was heated at a rate of 1° C. per minute to confirm that the liquid crystal gel is transformed into an isotropic solution at 34.7° C. by a phase transition. On the other hand, when cooling at a rate of 1° C. per minute, this liquid crystal gel was transformed from the isotropic solution into a liquid crystal gel by the phase transition at 34.3° C. The gel stably maintained the liquid crystal state at room temperature exhibiting no fluidity.

(Fabrication and evaluation of liquid crystal device)

A liquid crystal device having a light adjusting layer consisting of the liquid crystal gel produced above was prepared by the process (a) in the Example 6 and evaluated in the same manner as in Example 6. The results are shown in Table 2.

Example 9

(Preparation of liquid crystal gel)

5.0 g of p-methoxybenzylidene-p'-butylaniline, as liquid crystal molecule, and 0.089 g of 1,2-bis-(undecylcarbonylamino)cyclohexane, as a gelling agent, were dissolved in 100 g of methylene chloride at room temperature to produce a homogeneous solution. The methylene chloride was volatilized by drying in a flow of air to obtain a homogeneous liquid crystal gel comprising the gelling agent and liquid crystal molecules.

This liquid crystal gel was heated at a rate of 1° C. per minute to confirm that the liquid crystal gel is transformed into an isotropic solution at 40.0° C. by a phase transition. On the other hand, when cooling at a rate of 1° C. per minute, this liquid crystal gel was transformed from the isotropic solution into a liquid crystal gel by the phase transition at 39.0° C. The gel stably maintained the liquid crystal state at room temperature exhibiting no fluidity.

(Fabrication and evaluation of liquid crystal device)

A liquid crystal device having a light adjusting layer consisting of the liquid crystal gel produced above was prepared by the process (a) in the Example 6 and evaluated in the same manner as in Example 6. The results are shown in Table 2.

TABLE 2

|  | Driving voltage $V_{90}$ (volt) | Driving voltage $V_{10}$ (volt) | Contrast $(T_{90}/T_0)$ |
|---|---|---|---|
| Example 7 | 14 | 6 | 12/1 |
| Example 8 | 16 | 8 | 9/1 |
| Example 9 | 19 | 7 | 11/1 |

The liquid crystal gel of the present invention is substantially non-fluid so that it is easy to handle. In addition, the liquid crystal gel exhibits optical anisotropy within a certain temperature range.

Moreover, because the liquid crystal gel of the present invention can be manufactured by merely mixing liquid crystal molecules and a gelling agent, the production process is remarkably simplified.

Furthermore, because the liquid crystal gel of the present invention is thermally reversible, the state of the phase of the liquid crystal gel can be changed merely by controlling the temperature. Accordingly, an operation such as exposure to ultraviolet radiation which is required for the conventional high polymer dispersion-type liquid crystal can be eliminated by using this liquid crystal gel.

In addition, liquid crystal molecules can be gelatinized into a liquid crystal gel possessing optical anisotropy by means of a simple and rapid process using a small amount of the gelling agent of the present invention.

According to another feature of the present invention, a liquid crystal device exhibiting superior contrast can be provided using the liquid crystal gel of the present invention.

Because the liquid crystal gel of the present invention can preserve a certain configuration, this gel can be used to maintain an accurate distance between the substrates in a liquid crystal device.

Another advantage in the use of the liquid crystal gel of the present invention is in the simple and rapid process for fabricating a liquid crystal device as compared with the case using a conventional high polymer dispersion-type liquid crystal. Specifically, the operation and devices for exposure to ultraviolet radiation which are required for the conventional high polymer dispersion-type liquid crystal can be eliminated by using this liquid crystal gel.

The liquid crystal device of the present invention can be driven by a low voltage using a commonly used drive circuit without exhibiting noticeable hysteresis. Thus, the device can be applied to a decorative display plate for advertisments, a display of a clock or electric calculator, and other displays requiring a bright screen.

Obviously, numerous modifications and variations of the present invention are possible in light of the above teachings. It is therefore to be understood that within the scope of the appended claims, the invention may be practiced otherwise than as specifically described herein.

What is claimed:

1. A liquid crystal gel, comprising liquid crystal molecules and a gelling agent, wherein the gelling agent is at least one compound selected from the group consisting of 1,2-bis-(11-(4-cyanobiphenyl-4'-oxo)undecylcarbonylamino) cyclohexane, 1,2-bis-(undecylcarbonylamino) cyclohexane, 1,2,3,4-dibenzylidene-D-sorbitol, 12-hydroxystearic acid, N-lauroyl-L-glutamic acid-α, γ-bis-n-butylamide, spin-labeled steroids, cholesterol derivatives having the following formula (8), aluminum dialkylphosphate, phenol-based cyclic oligomers, 2,3-bis-n-hexadecyloxyanthracene, and cyclic depsipeptides

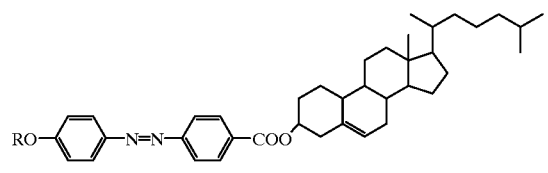

formula (8)

2. The liquid crystal gel according to claim 1, wherein the content of the gelling agent is in the range of about 0.01 to 20 mol % by weight for 100 mol % by weight of the total of the liquid crystal molecules and the gelling agent.

3. The liquid crystal gel according to claim 1, wherein the molecular weight of the liquid crystal molecule is 2,000 or less.

4. The liquid crystal gel according to claim 1, wherein the liquid crystal molecule is a biphenyl molecule, a phenylcyclohexane molecule, a phenylpyridine molecule, a cyclohexylcyclohexane-type molecule, or a mixture of two or more of these types of liquid crystal molecules.

5. The liquid crystal gel according to claim 1, wherein the liquid crystal molecule is at least one compound selected from the group consisting of 4-n-heptyloxy-4'-cyanobiphenyl, p-methoxybenzylidene-p'-butylaniline, 4-n-decanoxy-4'-cyanobiphenyl, and 4-n-pentyl-4'-cyanobiphenyl.

6. The liquid crystal gel according to claim 1 which exhibits optical anisotropy in a temperature range from about −20 to 80° C.

7. A liquid crystal device comprising a light adjusting layer which comprises liquid crystal molecules and a gelling agent, wherein the gelling agent is at least one compound selected from the group consisting of 1,2-bis-(11-(4-cyanobiphenyl-4'-oxo)undecylcarbonylamino) cyclohexane, 1,2-bis(undecylcarbonylamino) cyclohexane, 1,2,3,4-dibenzylidene-D-sorbitol, 12-hydroxystearic acid, N-lauroyl-L-glutamic acid-α, γ-bis-n-butylamide, spin-labeled steroids, cholesterol derivatives having the following formula (8), aluminum dialkylphosphate, phenol-based cyclic oligomers, 2,3-bis-n-hexadecyloxyanthracene, and cyclic depsipeptides

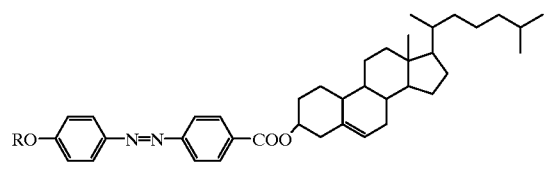

formula (8)

8. The liquid crystal device according to claim 7, wherein the thickness of the light adjusting layer is in the range of about 1 to 50 μm.

9. The liquid crystal device according to claim 7, wherein the liquid crystal device is a liquid crystal display.

10. A process for fabricating a liquid crystal device comprising,

① a step of preparing an isotropic solution which contains liquid crystal molecules and a gelling agent, wherein the gelling agent is at least one compound selected from the group consisting of 1,2-bis-(11-(4-cyanobiphenyl-4'-oxo)undecylcarbonylamino) cyclohexane, 1,2-bis(undecylcarbonylamino) cyclohexane, 1,2,3,4-dibenzylidene-D-sorbitol, 12-hydroxystearic acid, N-lauroyl-L-glutamic acid-α,γ-bis-n-butylamide, spin-labeled steroids, cholesterol derivatives having the following formula (8), aluminum dialkylphosphate, phenol-based cyclic oligomers, 2,3-bis-n-hexadecyloxyanthracene, and cyclic depsipeptides,

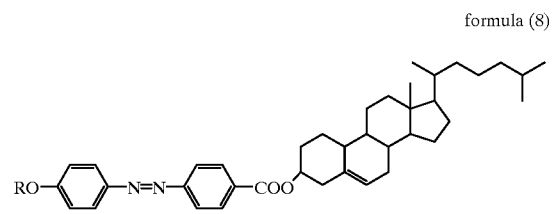

formula (8)

② a step of laminating a layer of the isotropic solution on a substrate, and

③ a step of forming a liquid crystal gel by cooling the laminated isotropic solution to a temperature range wherein the laminated layer becomes a liquid crystal gel.

* * * * *